May 8, 1934.  A. J. PONTI  1,957,504
ROTARY WELL DRILLING RIG
Filed Nov. 15, 1929
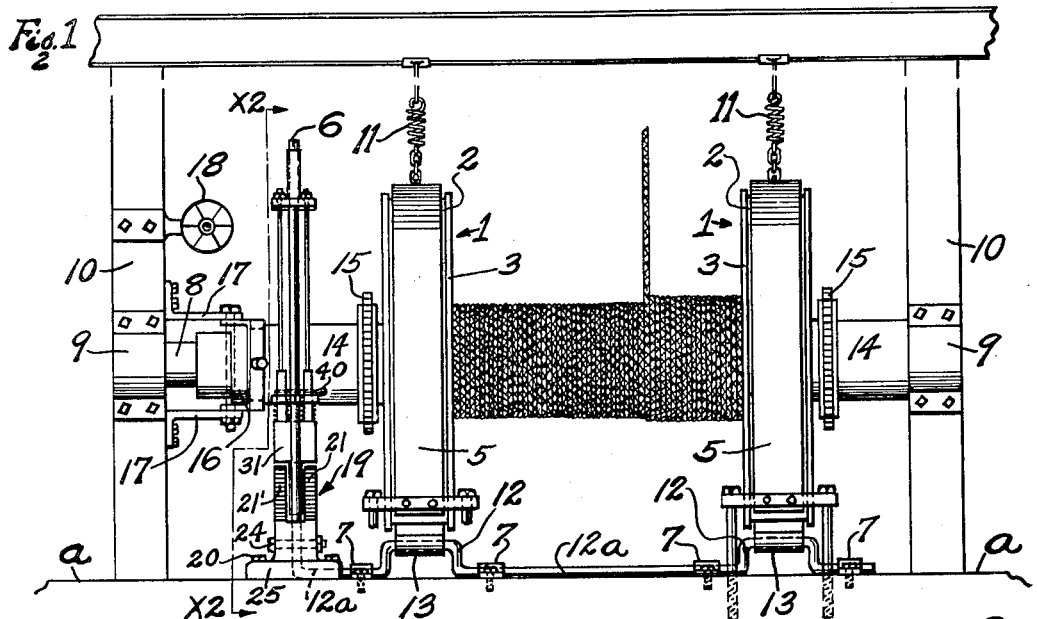
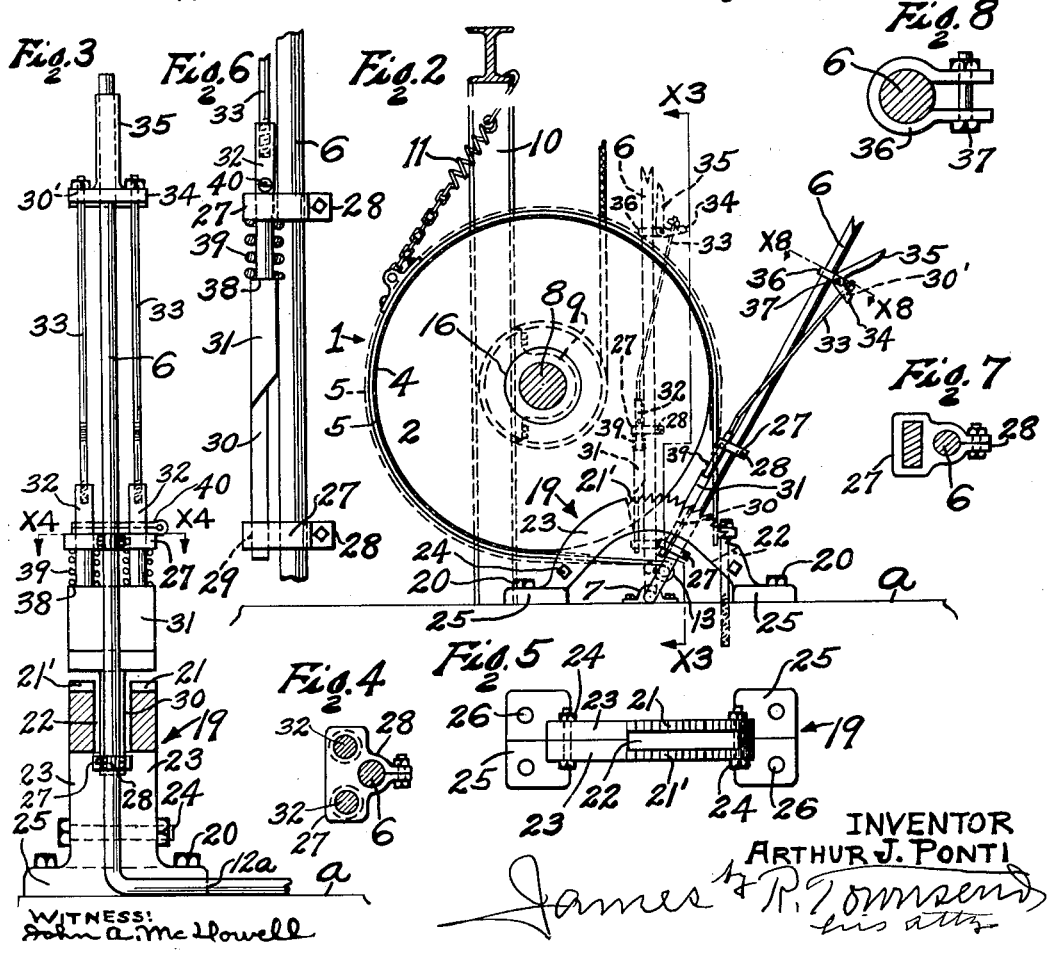
INVENTOR
ARTHUR J. PONTI Patented May 8, 1934

1,957,504

UNITED STATES PATENT OFFICE 1,957,504

ROTARY WELL DRILLING RIG

Arthur J. Ponti, Los Angeles, Calif.

Application November 15, 1929, Serial No. 407,355

1 Claim. (Cl. 74—39)

This invention relates to means for making the operation of the hoist and draw works in well drilling tools of the rotary system safer than heretofore, and an object is to lessen the likelihood of breakage and of injury to workmen from the operation of such machinery.

Hoists of the character referred to are employed in the drilling rigs for lowering and drawing well casing and strings of well tools, and the weights involved are very great. Such weights are handled by wire cables wound on draw work drums that are operated by powerful machinery and the draw works are provided with brake mechanism under the control of the operator for holding the drum and to prevent it from unwinding too rapidly, when the tools or casing are lowered.

The forces are so great and so instantaneous in their action that it requires great strength and intense attention and quickness of action on the part of the operator to handle them. Frequently the operator has to change instantly from controlling the engine on the uplift, to stopping the engine, to applying the brake, and to shifting the clutch to connect the drum to the engine; and if the operator fails to make the required movement at exactly the necessary moment, an accident is likely to occur.

It is often necessary that the drawing operation must stop and the load must be held or it will back down in an instant, and in making the change from drawing, the operator has to stop the engine, apply the brake and release the clutch, and the brake must be set and the clutch released in the moment of pause before the force of gravity acting upon the load causes it to drop.

Practically in the operation of drilling, the weight of the tools is held by the brake on the brake flanges and the operator usually holds the brake lever in braking position by means of his hand; but if he wishes to leave the brake and allow the tools to keep rotating, it is customary for him to fasten the brake handle by a chain that is fastened to the floor.

In the drilling operation the string of tools is allowed to rest on the bottom of the hole to only such an extent as is required for proper drilling and the operator holds the brake at the proper tension to control the feeding of the bit.

When the operator wishes to change from the drilling operation to lifting the drill pipe, he engages the clutch while holding the brake down, and then starts the engine; the brake must be held down until the clutch is fully engaged.

Heretofore at the time of making a change from drilling to lifting the drill pipe, it was necessary for the operator to either hold the brake lever down by hand or to chain the brake lever down to the floor. Then while the lever was so held down, it was necessary to simultaneously engage the clutch and open the engine throttle and release the brake. To perform this operation with a chained down brake lever is very troublesome and causes so much lost time that the operators on the usual rigs prefer to hold the brake lever down by hand while making the change.

This mode of operation, however, is dangerous, because the operator will be leaning over his brake to hold it down and at the same time will be reaching up with his hand to open the throttle; and when the throttle is opened with the clutch engaged, the draw works drum will be suddenly rotated by the engine, thus bringing onto the brake band, the strain of the cable in starting to lift the pipe, and the friction on the brake band will cause the brake lever to fly up unless it is firmly held down.

Serious injuries have resulted from such operation and there has heretofore been no method or means proposed which would guarantee that such conditions leading to such accidents would not occur.

An object is to provide a brake lever ratchet arrangement whereby the pawl is between the brake lever and the brake band, and is releasable by a bell crank lever that operates by a pull upon pawl releasing rods and is operable by a push on the bell crank lever in the direction of the brake lever and band, so that the operator can instantly release the ratchet by a push of the wrist or arm, on the handle of the bell crank in direction of the brake band.

An object of this invention is to eliminate the likelihood of such accidents and to enable the operator to change from drilling operation to drawing operation with greater ease than heretofore.

An advantage of this invention is that I have eliminated all danger from the kick-back of the brake.

If the operator of a rig not equipped with my invention wishes to leave his station while the weight of the tools is held by the brake he will have to use the chain to hold the lever down during his absence.

An object of this invention is to enable the operator to instantly apply the brake so as to hold the tools and relieve him from the necessity of further attention, so that he can leave his station with perfect security against dropping of the tools.

Another object of this invention is to so construct this device that it may be installed on drilling rigs of the old type as they have heretofore been, and now remain, set up for operation.

The invention may also be installed in new and modern drill rigs.

Another object of the invention is to make provision whereby the driller will be enabled to operate his brake in the same way as heretofore while pulling out for installation of a new bit, and for returning the drill to work.

Other objects, advantages and features of invention may appear from the accompanying drawing, the subjoined detailed description and the appended claim.

The accompanying drawing illustrates the invention.

Figure 1 is a fragmental elevation showing a safety rotary well drilling rig exemplifying the invention applied with the arrangement of draw works throttle, clutch and brake lever of the draw works of a rotary well drilling rig, parts of which are shown; the brakes being shown in released position.

Fig. 2 is an elevation in section on line x2, Fig. 1; the parts being shown in solid lines with the brake set, and in broken lines with the brake released.

Fig. 3 is an enlarged elevation in section on line x3, Fig. 2, showing parts of the invention with the brake released.

Fig. 4 is a section on line x4, Fig. 3.

Fig. 5 is a plan detail view of the ratchet base assembled but not installed.

Fig. 6 is an enlarged fragmental elevation of this brake lever and attachments viewed from the left of Fig. 3.

Fig. 7 is an enlarged plan view of the bottom clip and a fragment of the brake lever in place.

Fig. 8 is an enlarged plan view on line x8, Fig. 2, omitting the pawl releasing lever.

Arrows on the section lines in the several views indicate the direction of sight.

The draw works shown in the drawing are of well known type and are shown mounted on the floor $a$ of a derrick, not shown, and comprise a drum 1, its brake flanges 2, brake 4 with its bands 5 and brake lever 6 journalled to the floor $a$ by the strap 7, the draw works drum shaft 8 is mounted in boxes 9 that are fixed to the jack post 10, and the usual spring means 11 to normally hold the brake bands free from the brake flanges when the brake lever 6 is thrown back into the position indicated in broken lines in Fig. 2.

The brake rod and lever in common use is commonly made of a steel rod which may be about an inch and a half, more or less, in diameter, and provided with the crank bends 12, and the intermediate journalled portions 12a, made by bending the rod as indicated in Fig. 1, and the free ends 13 of the bands are connected to the cranks; and when power is applied to the brake lever there is a certain yielding of the lever under the hand of the operator whereby the brake bands are applied effectively without serious jar to the hand of the operator, and when the operator releases the handle, such resiliency is apt to cause the handle to swing back with considerable force.

The draw work shaft 14 is provided with sprocket wheels 15 driven by an engine, not shown, through sprocket chains, also not shown, when the clutch 16 supported by brackets 17 on the jack post 10 is engaged and the engine throttle 18 is open.

It is thus seen, by reference to Fig. 1, that I have produced a new arrangement for a rotary drilling rig whereby the operator is no longer subjected to the excessive strain he has heretofore been subjected to in the operation of rotary drilling rigs.

I have mounted the draw works throttle 18 and the draw works clutch bracket 17 with the draw works clutch 16 on the right hand side of the left hand jack post 9, and have mounted the draw works brake lever to swing in a plane close to the plane of the clutch, thus bringing the draw works lever close to the zone of operation of the brake lever by the right hand 1 and bringing the throttle and the draw works clutch into the zone of left hand operation of the draw works throttle and the draw works clutch, thereby affording safety and ease of operation to the operator, and reducing the danger of breakage.

19 in a general way indicates a ratchet segment fastened to the floor of the derrick by bolts 20 and provided with toothed segments 21, 21' arranged on opposite sides of a slot 22. Said segments are formed on arches 23, fastened together by bolts 24 and provided with feet 25 having bolt holes 26 through which the bolts 20 are inserted into the derrick floor $a$. The toothed segments 21 are formed on that side of the arches toward the operator's station and I have provided the brake lever 6 with clips 27 with a clamp 28 adapted to be slipped down upon the brake lever 6 sufficiently far to be below the toothed segment when said segment is in place; and is provided with a guideway 29 for a guide extension 30 of a pawl 31 adapted to engage the teeth of the toothed segment.

Said pawl is provided at its upper edge with guide pins 32 operable by connecting rods 33 screwed into the guide pins 32 and extending through a cross head 34 of a bell crank pawl releasing lever 35 that is secured to the brake lever by a clip 36 clamped on the brake lever by a clamp bolt 37 which serves as a pivot for the grip lever 35.

The connecting rods 33 are bent from front to rear of the brake lever 6 and pass through holes 30' in the cross-head 34. The connecting rods 33 are provided below the clip 27 with shoulders 38 which form seats for springs 39 that tend to force the connecting rods down to cause the pawl 31 to engage the teeth of the segment.

After the brake lever has been equipped with the pawl and the clips, the arches are brought into position on opposite sides of the brake lever, the pawl being elevated above the arches, the arches are then secured to the derrick floor $a$ by the bolts 20 and the improvement has been installed.

Means are provided for holding the pawl 31 elevated and for this purpose I have shown a pin 40 inserted through holes in the pins 32 which are above the clips 27 when the pawl is elevated and such pin so inserted holds the pawl elevated so it will not engage the toothed segments, thus leaving the brake lever free to be handled at the will of the operator.

By constructing the segment in halves having a recess cut into each half between the toothed portions of the segments, I have made it possible to conveniently install the safety device for use with draw work installations now in the field.

By pivoting the pawl releasing handle 35 on the front side of the brake lever, I enable the operator to release the brake by a single thrust of the hand, first drawing the pawl and at once bringing the fingers into position to grasp the brake handle for setting the brake by a return movement of the hand, thus keeping the brake under perfect control without lost motion.

By constructing the segments in halves having a recess cut into each half between the toothed portion of the segments, I have made it possible to conveniently install the safety device for use with draw work installations now in the field.

By pivoting the pawl releasing handle 35 on the front side of the brake lever, I enable the operator to release the brake by a single thrust of the hand, first drawing the pawl and at once bringing the fingers into position to grasp the brake handle for setting the brake by a return movement of the hand, I have enabled the operator to keep the brake under perfect control without delay or lost motion.

The brake is held during the operation of drilling and must be held also when the clutch is being engaged. In normal drilling the clutch that connects the drum with the engine is thrown out and when it is desired to pull the pipe and the rotary tools, it is necessary to throw the clutch in so that the engine can drive the drum to wind the cable. It is necessary, in making the change from drilling to drawing, that the drum be held stationary and that the engine shall be stationary while the clutch is being thrown in to connect the engine with the drum. When the clutch has been thrown in to connect the engine with the drum, then the operator will open the throttle to cause the engine to revolve the drum and take up the cable and lift the pipe.

If the clutch works hard and does not shift readily, the pawl may be let into the toothed segment and the tools are safely held while the clutch is being changed.

The two halves of the segment are provided with teeth that are alined with each other so that the pawl engages at its opposite edges. Otherwise the strain would be apt to wrench the ratchet segments apart.

At the moment required for releasing the brake, the operator simply strikes upon the release handle of the bell crank, and the action of the brake band spring 11, moves the brake lever to brake release position and yieldingly holds it in that position so that no further attention is required until it is desired to again apply the brake.

I claim:—

In a rotary well drilling rig having a controlling brake and a pawl; a segment; a brake lever provided with clips fixed thereto one above the other; connecting rods having pins fixed thereto that are slidably mounted in the upper clip and extensions extending downwardly from said pawl and slidably mounted in the lower clip; springs mounted on said pins interposed between the upper clip and pawl that force the connecting rods down to cause said pawl to engage the teeth of the segment.

ARTHUR J. PONTI.